US009057902B2

(12) United States Patent
Zhang et al.

(10) Patent No.: US 9,057,902 B2
(45) Date of Patent: Jun. 16, 2015

(54) LIQUID CRYSTAL MODULE AND FIXING DEVICE

(71) Applicant: Shenzhen China Star Optoelectronics Technology Co., Ltd., Shenzhen, Guangdong (CN)

(72) Inventors: Tian Zhang, Shenzhen (CN); Yuchun Hsiao, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 366 days.

(21) Appl. No.: 13/813,165

(22) PCT Filed: Jan. 15, 2013

(86) PCT No.: PCT/CN2013/070497
§ 371 (c)(1),
(2) Date: Jan. 30, 2013

(87) PCT Pub. No.: WO2014/107908
PCT Pub. Date: Jul. 17, 2014

(65) Prior Publication Data
US 2014/0192289 A1 Jul. 10, 2014

(30) Foreign Application Priority Data

Jan. 8, 2013 (CN) .......................... 2013 1 0005826

(51) Int. Cl.
*G02F 1/1333* (2006.01)

(52) U.S. Cl.
CPC .................... *G02F 1/133308* (2013.01); *G02F 2001/133314* (2013.01); *G02F 2001/133322* (2013.01); *G02F 2201/46* (2013.01); *G02F 2201/54* (2013.01)

(58) Field of Classification Search
CPC ..................................................... G02F 1/1333
See application file for complete search history.

(56) References Cited

U.S. PATENT DOCUMENTS

| 7,940,287 | B2 * | 5/2011 | Kim et al. | 349/60 |
| 2010/0177124 | A1 * | 7/2010 | Ryu et al. | 345/690 |
| 2010/0328927 | A1 * | 12/2010 | Huang | 362/97.1 |
| 2011/0170034 | A1 * | 7/2011 | Jeong | 349/61 |
| 2012/0092568 | A1 * | 4/2012 | Yokota | 348/790 |

(Continued)

FOREIGN PATENT DOCUMENTS

| CN | 101071227A A | 11/2007 |
| CN | 101435948A A | 5/2009 |

(Continued)

*Primary Examiner* — Timothy L Rude
(74) *Attorney, Agent, or Firm* — Andrew C. Cheng

(57) ABSTRACT

A fixing device for connecting an optical film with a back plate is disclosed. The fixing device includes a supporting portion, and a protrusive portion. The supporting portion is for connecting to a sidewall of the back plate. The protrusive portion is for passing through a through hole on an extended portion of the optical film such that the optical film is fixed on the back plate. The extended portion extrudes from a main body of the optical film. The fixing devices relate to a pure mechanical or semi-mechanical connection. Such connection structure may prevent the optical film from falling off due to environment changes. In addition, the fixing devices may be used over and over. Furthermore, the connection structure is more compact than the typical ones. The fixing devices not only satisfy the trend toward narrower sidewall of liquid crystal modules, but also prevent the optical film from being bent due to thermal expansion and contraction.

10 Claims, 3 Drawing Sheets

(56) References Cited

U.S. PATENT DOCUMENTS

2012/0099050 A1* 4/2012 Kasai et al. .................. 349/64
2014/0218963 A1* 8/2014 Tang ............................ 362/606

FOREIGN PATENT DOCUMENTS

| CN | 201724152U U | 1/2011 |
| CN | 102519011A A | 6/2012 |

* cited by examiner

LIQUID CRYSTAL MODULE AND FIXING DEVICE

BACKGROUND OF THE INVENTION

1. Field of the Invention

Embodiments of the present disclosure relate to liquid crystal display technology, and more particularly to a fixing device for an optical film of the liquid crystal module.

2. Discussion of the Related Art

Optical films of liquid crystal modules have converted light sources to become uniform surface light source. With the trend toward narrower sidewalls, positioning of the optical film has become more and more difficult. The optical film may be bent due to inappropriate positioning. In addition, the optical film may exhibit undesirable wrinkles during reliable testing processes.

Currently, the fixing device for assembling the optical film on the sidewalls of a back plate includes adhesive tapes and positioning pillars. As shown in FIG. 1, one end of the adhesive tape 40 connects between an edge of the optical film 30 and the sidewall of the back plate 10. The connecting structure is not feasible due to the above fixing method. The optical film 30 may be bent due to thermal expansion and contraction. In addition, the adhesive tape 40 may be fall off due to environment changes after a period of time. As shown in FIG. 2, the positioning pillar 50 is arranged on the back plate 10 by increasing components and configuring the structure. A through hole is arranged on the edge of the optical film 30 such that the positioning pillar 50 may engage with the through hole. The fixing method may deform the optical film 30, and the back plate may have to be narrower due to the assembly space of the back plate.

SUMMARY

The object of the claimed invention is to provide a liquid crystal module and a fixing device that are capable of preventing the optical film from being bent. In addition, the trend toward narrower sidewalls of the back plate may be achieved.

In one aspect, a fixing device for connecting an optical film with a back plate includes: a supporting portion for connecting to a sidewall of the back plate; a protrusive portion for passing through a through hole on an extended portion of the optical film such that the optical film is fixed on the back plate, and the extended portion extrudes from a main body of the optical film; and an adhesive layer corresponding to the supporting portion, and the supporting portion is adhered to the sidewall of the back plate by the adhesive layer. The supporting portion and the protrusive portion are integrally formed.

Wherein a height of the fixing device is not larger than the height of the sidewall.

In another aspect, a fixing device for connecting an optical film with a back plate includes: a supporting portion for connecting to a sidewall of the back plate; a carrying portion forming an acute angle with a bottom portion of the supporting portion, and the acute angle is in the range between 80 degrees and 100 degrees; and a protrusive portion for passing through a through hole on an extended portion of the optical film such that the optical film is fixed on the back plate, and the extended portion extrudes from a main body of the optical film. The supporting portion, the carrying portion, and the protrusive portion are integrally formed.

Wherein the carrying portion and the supporting portion are connected by a rivet or by welding.

Wherein the carrying portion is fixed on the back plate by glue or welding.

Wherein a positioning portion extends from one end of the bottom portion of the supporting portion, and the positioning portion aligns with a bottom portion of the carrying portion.

Wherein a height of the fixing device is not larger than the height of the sidewall.

In another aspect, a liquid crystal module includes: an optical film; a back plate comprising a sidewall for supporting the optical film; the optical film comprises an extended portion extruding from a main body of the optical film, and the extended portion comprises a through hole; and wherein the back plate comprises a plurality of fixing devices. Each of the fixing devices includes: a supporting portion for connecting to a sidewall of the back plate; and a protrusive portion for passing through a through hole on the optical film such that the optical film is fixed on the back plate. The supporting portion and the protrusive portion are integrally formed.

Wherein a groove is formed on the sidewall and the groove is corresponding to the extended portion, and the protrusive portion protrudes from a bottom portion of the groove and corresponds to a receiving space of the groove.

Wherein the height of the fixing devices is not larger than the height of the sidewall, and the supporting portion is not protrusive from the bottom portion of the groove.

Wherein the supporting portion is adhered to the sidewall of the back plate.

Wherein the liquid crystal module further comprises a carrying portion forming an acute angle with a bottom portion of the supporting portion, and the acute angle is in the range between 80 degrees and 100 degrees.

Wherein the carrying portion and the supporting portion are connected by a rivet or by welding.

Wherein the carrying portion is fixed on the back plate by a rivet.

Wherein a positioning portion extends from one end of the bottom portion of the supporting portion, and the positioning portion aligns with the bottom portion of the carrying portion.

DETAILED DESCRIPTION OF THE EMBODIMENTS

Embodiments of the invention will now be described more fully hereinafter with reference to the accompanying drawings, in which embodiments of the invention are shown.

Figure 1:
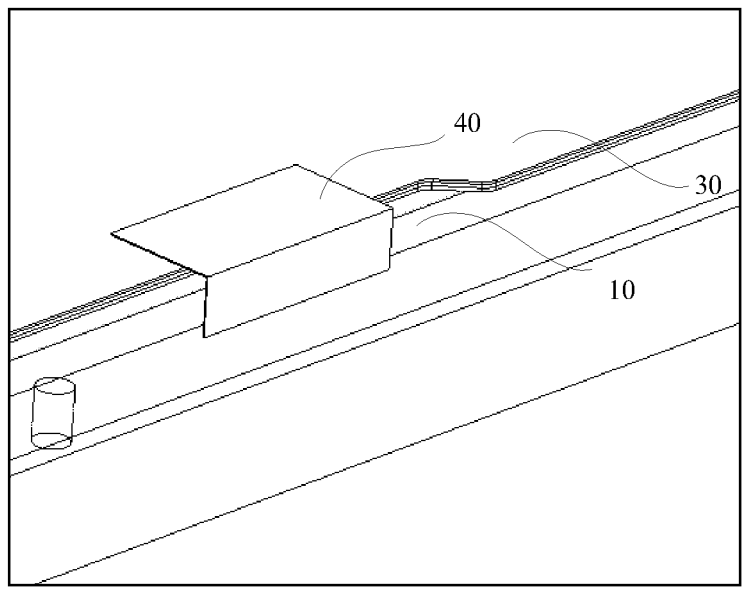
FIG. 1 is a schematic view of the structure of a conventional fixing device for an optical film.
Figure 2:
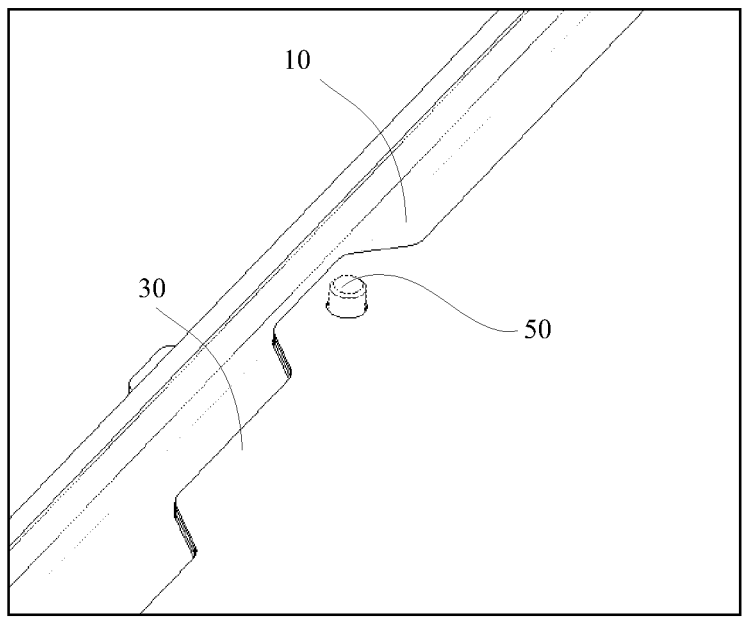
FIG. 2 is a schematic view of the structure of another conventional fixing device for the optical film.
Figure 3:
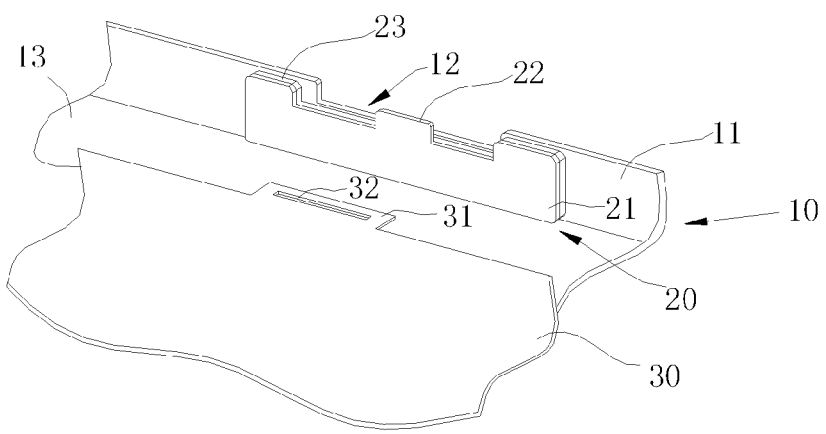
FIG. 3 is an exploded view of the liquid crystal module in accordance with a first embodiment.

As shown in FIG. 3, the liquid crystal module in the first embodiment includes an optical film 30 and a back plate 10 having a sidewall 11 for supporting the optical film. The optical film 30 includes an extended portion 31 extruding from a main body of the optical film 30. In addition, the extended portion 31 includes a through hole 32.

The fixing device 20 includes a supporting portion 21 connecting to the sidewall 11 of the back plate 10, and a protrusive portion 22 arranged on a top portion of the supporting portion 21. The supporting portion 21 and the protrusive portion 22 are integrally formed to pass through the through hole 32 on the extended portion 31 so that the optical film 30 is fixed on the back plate 10.

In the embodiment, a groove 12 is formed on the sidewall 11 and the groove 12 is corresponding to the extended portion 31 of the optical film 30. The supporting portion 21 contacts closely with the internal surface of the sidewall 11. The protrusive portion 22 protrudes from a bottom portion of the groove 12 and corresponds to a receiving space of the groove 12.

The supporting portion 21 is adhered to the sidewall 11 of the back plate 10 by an adhesive layer 23. To ensure the stability of the connection, a thickness of the adhesive layer 23 is preferably larger than 0.5 mm. For example, the adhesive layer 23 may be a thicker double-sided adhesive tape, or powerful glue. The supporting portion 21 not only has to provide both the positioning function and the connecting function for the sidewall 11. In addition, the supporting portion 21 may strengthen the hardness of the sidewall 11. The dimension of the contact area between the supporting portion 21 and the sidewall 11 may be enlarged. For example, the supporting portion 21 may surround the bottom portion and lateral portions of the groove 12. Correspondingly, the dimension of the adhesive layer 23 is the same with that of the supporting portion 21 so as to achieve the best performance. However, the dimension of the fixing device 20 has to be within an appropriate range. For example, the height of the fixing device 20 is preferably not larger than the distance between the bottom portion of the groove 12 to the bottom 13 of back plate 10. In addition, the height of the protrusive portion 22 is not larger than the height of the sidewall 11. In this way, the fixing device can stably engage with the optical film 30 without affecting the assembly process of other components.

The thickness of the fixing device 20 is generally in a range between 0.4 mm and 0.6 mm. The width of the protrusive portion 22 and the supporting portion 21 may be configured according to the shape and the dimensional of the liquid crystal module. Correspondingly, the dimension of the through hole 32 of the extended portion 31 may be configured according to the width and the thickness of the protrusive portion 22.

Figure 4:
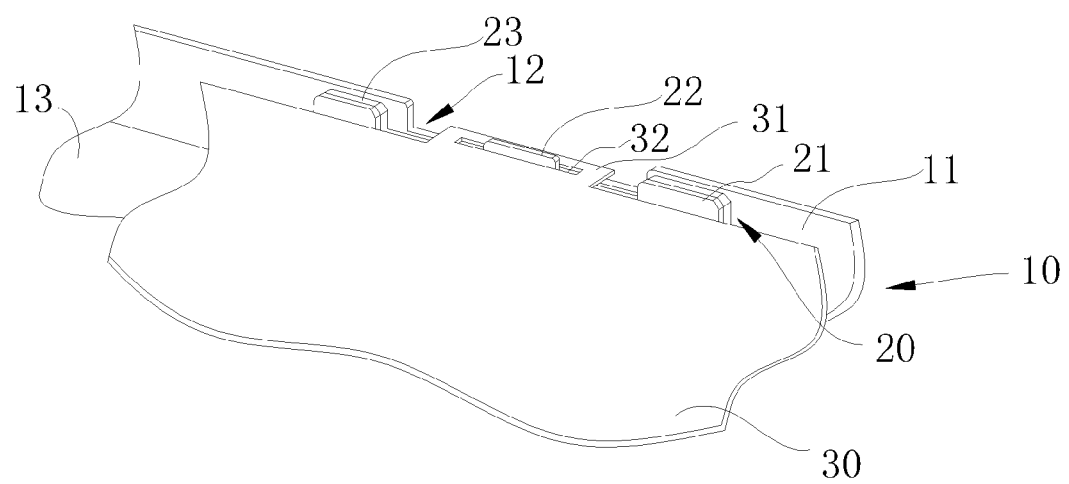
FIG. 4 is a schematic view of the assembled liquid crystal module in accordance with the first embodiment

When positioning the optical film 30, a plurality of grooves 12 are arranged on the sidewall 11 in accordance with the extended portion 31. Firstly, the supporting portion 21 of the fixing device 20 engages with the grooves 12. In addition, the protrusive portion 22 is controlled to be in a middle of the grooves 12 and to be not higher than the sidewall 11. Afterward, the supporting portion 21 with the double-sided adhesive tape is adhered to the internal surface of the sidewall 11 so as to fix the supporting portion 21 on the sidewall 11. After the plurality of fixing devices 20 are arranged, the optical film 30 is fixed on the back plate 10 by engaging the through hole 32 with the protrusive portion 22. The extended portion 31 is embedded within the groove 12 as shown in FIG. 4.

It is to be understood that a plurality of fixing devices may be arranged in accordance with the dimension of the liquid crystal module such that the optical film may be stably fixed.

The fixing devices not only can fix the optical film, but also provide a solid structure without occupying additional space. As such, the fixing device will not affect the assembly of other components while the trend toward narrower sidewalls can be satisfied at the same time. Furthermore, the optical film will not be bent due to thermal expansion and contraction. The thickness of the sidewall of the claimed invention may be less than 1.5 mm to 6 mm than the conventional one, and the strength of the sidewall is not decreased.

In the second embodiment, the fixing device 20 is further enhanced.

Figure 5:
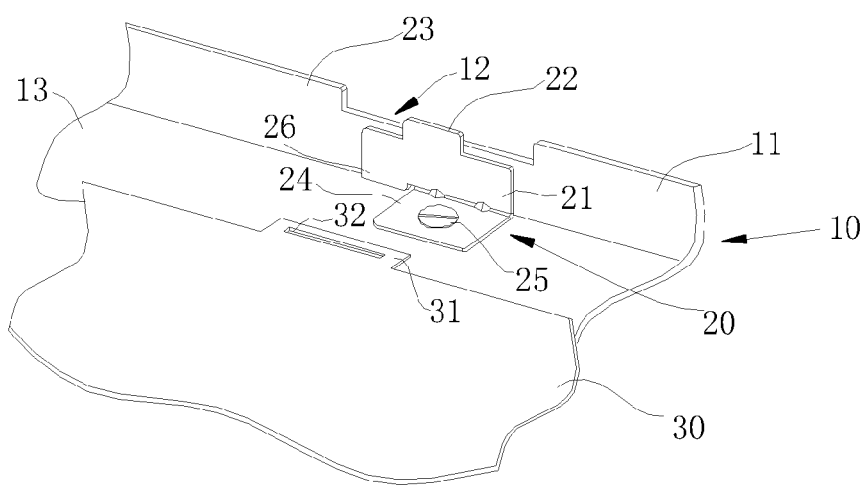
FIG. 5 is an exploded view of the liquid crystal module in accordance with a second embodiment.

As shown in FIG. 5, the fixing device 20 includes the supporting portion 21 connecting to the sidewall 11 of the back plate 10, and the protrusive portion 22 protrusive arranged on the top portion of the supporting portion 21. The supporting portion 21 and the protrusive portion 22 are integrally formed. In addition, the fixing device 20 further includes a carrying portion 24 forming an acute angle with the bottom portion of the supporting portion 21. The acute angle is in the range between 80 degrees and 100 degrees.

A positioning portion 26 extends from one end of the bottom portion of the supporting portion 21, and the positioning portion 26 aligns with a bottom portion of the carrying portion 24.

Similarly, a plurality of grooves 12 are arranged on the sidewall 11 in accordance with the extended portion 31. The plurality of grooves 12 are arranged on the sidewall 11 of the fixing device 20 contacts closely with the internal surface of the sidewall 11 surrounding the grooves 12. The protrusive portion 22 protrudes from the bottom portion of the groove 12 and corresponds to a receiving space of the groove 12. The dimension of the fixing device 20 has to be within the appropriate range. For example, the height of the fixing device 20 is preferably not larger than the distance between the bottom portion of the groove 12 to the bottom 13 of back plate 10. In addition, the height of the protrusive portion 22 is not larger than the height of the sidewall 11. In this way, the fixing device can stably engage with the optical film 30 without affecting the assembly process of other components.

The carrying portion 24 provides the positioning and connecting functions by connecting with the bottom 13 of the back plate 10. Preferably, the acute angle formed by the carrying portion 24 and the supporting portion 21 is 90 degrees. For example, the supporting portion 21 may be closely adhered to the internal surface of the sidewall 11 when the acute angle formed by the supporting portion 21 and the carrying portion 24 is 90 degrees and the bottom 13 is vertical to the sidewall 11. In this way, the carrying portion 24 may prevent the fixing device 20 from moving away the back plate 10. The supporting portion 21 not only has the same function with the protrusive portion 22, but also increases the strength of the sidewall 11. The carrying portion 24 may connect to the supporting portion 21 by a plurality of methods, such as hinged connection or welding, or the carrying portion 24 and the supporting portion 21 are integrally formed. The connection between the carrying portion 24 and the supporting portion 21 has to be formed in accordance with the acute angle between the bottom 13 and the sidewall 11 of the back plate 10. The carrying portion 24 and the bottom 13 of back plate 10 are connected preferably by rivets such that the fixing device 20 may be easily detached. It is to be understood that the carrying portion 24 may be fixed on the back plate 10 by glue or welding. In addition, the dimension of the supporting portion 21 may be enlarged. In this way, the connection between the fixing device 20 and the back plate 10 may be strengthened by adding the adhesive layer on the supporting portion 21.

Figure 6:
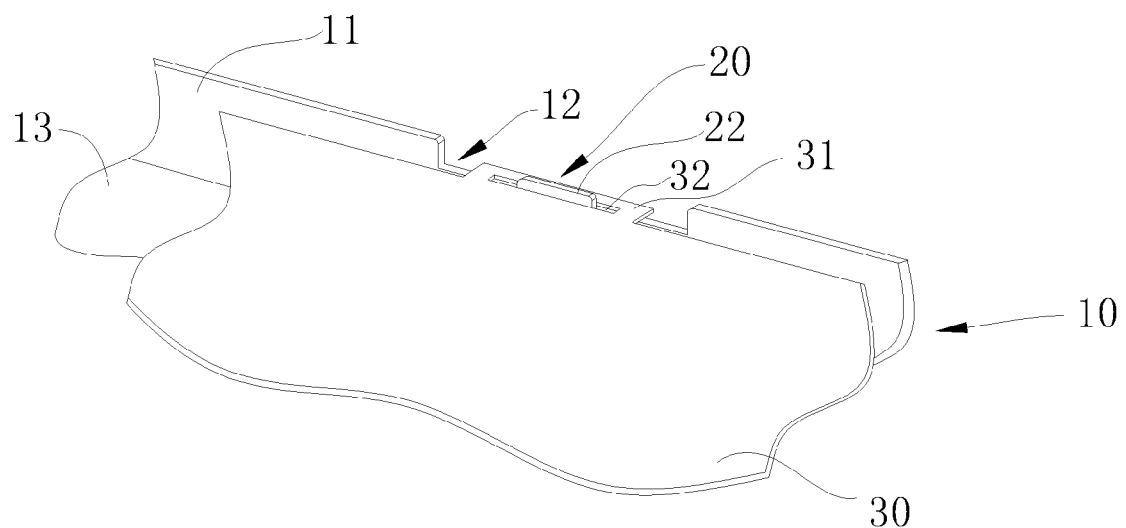
FIG. 6 is a schematic view of the assembled liquid crystal module in accordance with the second embodiment

When positioning the optical film 30, a plurality of grooves 12 are arranged on the sidewall 11 in accordance with the extended portion 31. Firstly, the supporting portion 21 of the fixing device 20 engages with the grooves 12. The protrusive portion 22 is controlled to be in the middle of the grooves 12 and to be not higher than the sidewall 11. Afterward, the carrying portion 24 is adhered to the bottom 13 of the back plate 10. The supporting portion 21 contacts closely with the internal surface of the sidewall 11. The carrying portion 24 is then fixed on the bottom 13 of the back plate 10 by fastening a rivet 25. After the plurality of fixing devices 20 are assembled, the optical film 30 is fixed on the back plate 10 by engaging the through hole 32 with the protrusive portion 22. The extended portion 31 of the optical film 30 is embedded within the groove 12 as shown in FIG. 6.

Similarly, a plurality of fixing devices may be arranged in accordance with the dimension of the liquid crystal module such that the optical film may be stably fixed.

Comparing to typical connection methods using adhesive tapes, the fixing devices relate to a pure mechanical or semi-mechanical connection. Such connection structure may prevent the optical film from falling off due to environment changes. In addition, the fixing devices may be used over and over. Furthermore, the connection structure is more compact than the typical ones.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A fixing device for connecting an optical film with a back plate, comprising:
   a supporting portion for connecting to a sidewall of the back plate;
   a carrying portion forming an acute angle with a bottom portion of the supporting portion, and the acute angle is in the range between 80 degrees and 100 degrees; and
   a protrusive portion for passing through a through hole on an extended portion of the optical film such that the optical film is fixed on the back plate, the extended portion extrudes from a main body of the optical film, and the supporting portion, the carrying portion and the protrusive portion are integrally formed,
   wherein a positioning portion extends from one end of the bottom portion of the supporting portion, and the positioning portion aligns with a bottom portion of the carrying portion.

2. The fixing device as claimed in claim 1, wherein the carrying portion and the supporting portion are connected by a rivet or by welding.

3. The fixing device as claimed in claim 1, wherein the carrying portion is fixed on the back plate by glue or welding.

4. The fixing device as claimed in claim 1, wherein a height of the fixing device is not larger than the height of the sidewall.

5. A liquid crystal module, comprising:
   an optical film;
   a back plate comprising a sidewall for supporting the optical film;
   the optical film comprises an extended portion extruding from a main body of the optical film, and the extended portion comprises a through hole; and
   wherein the back plate comprises a plurality of fixing devices, and each of the fixing devices comprise:
   a supporting portion for connecting to a sidewall of the back plate; and
   a protrusive portion for passing through a through hole on the optical film such that the optical film is fixed on the back plate, and the supporting portion is integrally formed with the protrusive portion, wherein the liquid crystal module further comprises a carrying portion forming an acute angle with a bottom portion of the supporting portion, and the acute angle is in the range between 80 degrees and 100 degrees, wherein a positioning portion extends from one end of the bottom portion of the supporting portion, and the positioning portion aligns with the bottom portion of the carrying portion.

6. The liquid crystal module as claimed in claim 5, wherein a groove is formed on the sidewall and the groove is corresponding to the extended portion, and the protrusive portion protrudes from a bottom portion of the groove and corresponds to a receiving space of the groove.

7. The liquid crystal module as claimed in claim 6, wherein the height of the fixing devices is not larger than the height of the sidewall, and the supporting portion is not protrusive from the bottom portion of the groove.

8. The liquid crystal module as claimed in claim 5, wherein the supporting portion is adhered to the sidewall of the back plate.

9. The liquid crystal module as claimed in claim 5, wherein the carrying portion and the supporting portion are connected by a rivet or by welding.

10. The liquid crystal module as claimed in claim 5, wherein the carrying portion is fixed on the back plate by a rivet.

* * * * *